(12) United States Patent
Kakkad et al.

(10) Patent No.: US 8,294,840 B2
(45) Date of Patent: Oct. 23, 2012

(54) LIQUID CRYSTAL DISPLAY DEVICE WITH FRINGE FIELD SWITCHING MODE

(75) Inventors: Ramesh Kakkad, Hsinchu (TW); Chieh-Wen Lin, Longjing Township (TW)

(73) Assignee: Chimei Innolux Corporation, Miao-Li County (TW)

( * ) Notice: Subject to any disclaimer, the term of this patent is extended or adjusted under 35 U.S.C. 154(b) by 664 days.

(21) Appl. No.: 12/051,006

(22) Filed: Mar. 19, 2008

(65) Prior Publication Data
US 2009/0237582 A1 Sep. 24, 2009

(51) Int. Cl.
*G02F 1/136* (2006.01)
*G02F 1/1343* (2006.01)
(52) U.S. Cl. .......................... 349/47; 349/141
(58) Field of Classification Search .............. 349/47, 349/39, 141
See application file for complete search history.

(56) References Cited

U.S. PATENT DOCUMENTS

| | | | |
|---|---|---|---|
| 5,182,620 A * | 1/1993 | Shimada et al. | 257/72 |
| 6,650,385 B1 * | 11/2003 | Liu | 349/113 |
| 6,784,955 B2 * | 8/2004 | Kwok et al. | 349/99 |
| 6,856,371 B2 | 2/2005 | Kim et al. | |
| 2005/0214983 A1 * | 9/2005 | Maekawa | 438/149 |

* cited by examiner

*Primary Examiner* — Mark Robinson
*Assistant Examiner* — Michael Inadomi
(74) *Attorney, Agent, or Firm* — Morris Manning & Martin LLP; Tim Tingkang Xia, Esq.

(57) ABSTRACT

A system for displaying images, having a display panel, comprising: a lower substrate with a first surface, wherein the first surface is divided into a pixel area and a driver area; a peripheral circuit within the driver area on the first surface; at least one thin film transistor is formed in the pixel area, wherein the thin film transistor comprises an active layer, a gate dielectric layer overlying the active layer, and a gate electrode overlying the gate dielectric layer, and the active layer has source and drain regions; a first transparent electrode layer directly overlapped on a portion of the drain region, electrically connected thereto; and a second transparent electrode pattern is disposed on the gate dielectric layer, opposing the first transparent electrode layer.

8 Claims, 14 Drawing Sheets

LIQUID CRYSTAL DISPLAY DEVICE WITH FRINGE FIELD SWITCHING MODE

BACKGROUND OF THE INVENTION

1. Field of the Invention

The present invention relates to liquid crystal display devices, and in particular relates to fringe field switching mode liquid crystal display (FFS-LCD) devices.

2. Description of the Related Art Liquid crystal display (LCD) devices possess the advantages of having a small size, being light weight and requiring low power consumption. Thus, LCD devices are being applied in a wide variety of electronic and communication devices including notebook computers, personal digital assistants (PDA), and mobile phones. Critical features for large-scale monitors and high-end TV applications include a fast response time, a high contrast ratio, a high transparency, and a wide viewing angle without gray scale inversion. In-plane switching (IPS) mode liquid crystal display devices meet the above-mentioned high quality display feature requirements and solve the viewing angle problems by orienting the liquid crystal molecules to be parallel with a substrate.

Meanwhile, fringe field switching liquid crystal display (FFS-LCD) devices have pixel and counter electrodes comprising transparent conductors and a narrower distance between electrodes than the distance between the upper and lower substrates to form a fringe field on the electrodes. During operation, the fringe field on the electrodes forces the substantially homogeneous liquid crystal molecules to rotate transversely between the substrates in which a wide viewing angle is accomplished since the light is transmitted through the horizontally arranged liquid crystal molecules. Moreover, since the counter electrode and the pixel electrode comprise transparent conductive materials, the aperture ratio and the transmittance ratio of the display devices can thereby be improved.

U.S. Pat. No. 6,856,371, the entirety of which is hereby incorporated by reference, disclose electrode structures of a conventional FFS-LCD device. The electrode structures are symmetrical and render high image display quality and a high transmittance ratio.

FIG. 1 is a cross section of a conventional fringe field switching liquid crystal display (FFS-LCD) device. An FFS-LCD 1 comprises a lower substrate 10, an upper substrate 20, and a liquid crystal layer 30 interposed between the lower substrate 10 and the upper substrate 20, serving as an LCD cell. A counter electrode 11 and a plurality of pixel electrodes 13 are disposed on the lower substrate 10. An insulating layer 15 is disposed between the counter electrode 11 and the plurality of pixel electrodes 13. A lower alignment layer 14 is disposed on the insulating layer 15 and covers the pixel electrodes 13. A color filter layer 25 and an upper alignment layer 24 are disposed on the inner surface of the upper substrate 20 and are adjusted to the liquid crystal layer 30.

FIG. 2 is a plan view of the lower substrate structure of a conventional fringe field switching liquid crystal display (FFS-LCD) device. Two parallel lines 3, 8 and two parallel data lines 7 are orthogonally intersected, enclosing a pixel area. The line 3 is a gate line. A counter electrode 11 and pixel electrodes 13 are disposed in the pixel area. The pixel electrodes 13 comprise two electrode bars 13a parallel to the data lines 7 and a plurality of inclined electrodes 13b with an inclined angle $\phi$ between the line m' and the line m that is parallel to the lines 3, 8. The two ends of each electrode 13b are separately connected to the two electrode bars 13a. Note that the inclined angle $\phi$ of the electrodes 13b directly affects the operating voltage of the FFS-LCD device. More specifically, the greater the inclination of electrodes 13b, the higher the voltage required to operate the FFS-LCD device.

For small FFS-LCD panels, the inclined angle $\phi$ of the electrodes 13b must be reduced to lower the operating voltage of the FFS-LCD device. A low inclined angle $\phi$ of electrodes 13b (e.g., less than 7°) can cause the disclination effect deteriorating display image quality. Conversely, high inclined angle $\phi$ of the electrodes 13b requires a high driving voltage such that the physical area of the thin film transistor (TFT) must be increased to provide adequate charge storage capability. The TFT structure comprises a gate line 3, a channel and source/drain regions 4, and source contact 6a and drain contact 6b. The drain contact 6b connects the pixel electrodes 13 via a contact plug 9. When the physical area of the thin film transistor (TFT) increases, however, the area of the pixel electrodes 13 must be reduced, thus, a small aperture ratio and a low transmittance ratio occur.

Thus, FFS-LCD devices with improved aperture and transmittance ratios are desirable.

BRIEF SUMMARY OF THE INVENTION

In view of the previously described problems, various embodiments of FFS-LCD devices with improved aperture and transmittance ratios are proposed. Specifically, the FFS-LCD devices are fabricated by a reduced mask-count process.

One embodiment of a system for displaying images, comprises a display panel comprising: a lower substrate with a first surface, wherein the first surface is divided into a pixel area and a driver area; a peripheral circuit within the driver area on the first surface; at least one thin film transistor is formed in the pixel area, wherein the thin film transistor comprises an active layer, a gate dielectric layer overlies the active layer, and a gate electrode overlies the gate dielectric layer, and the active layer has source and drain regions; a first transparent electrode layer directly overlapped on a portion of the drain region, electrically connected thereto; and a second transparent electrode pattern disposed on the gate dielectric layer, opposing the first transparent electrode layer.

Another embodiment of a fabrication method for a system for displaying images, comprises: providing a display panel including a lower substrate with a first surface, wherein the first surface is divided into a pixel area and a driver area; forming first and second active layers overlying the driver area, and a third active layer overlying the pixel area; forming a first transparent electrode layer partially overlapping a portion of the third active layer; forming a gate dielectric layer overlying the first, second, third active layers, and a first transparent electrode layer; forming a second transparent electrode pattern overlying the gate dielectric layer, opposing the first transparent electrode layer; performing a first metallization (M1), forming a first gate electrode overlying the first active layer, a second gate electrode overlying the second active layer, third and fourth gate electrodes overlying the third active layer, and a metal mask covering the second transparent electrode pattern; forming an interlayer dielectric layer overlying the overall lower substrate; performing a second metallization (M2) on the overall lower substrate; forming a passivation layer overlying the overall lower substrate; and connecting the lower substrate to the upper substrate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3A:
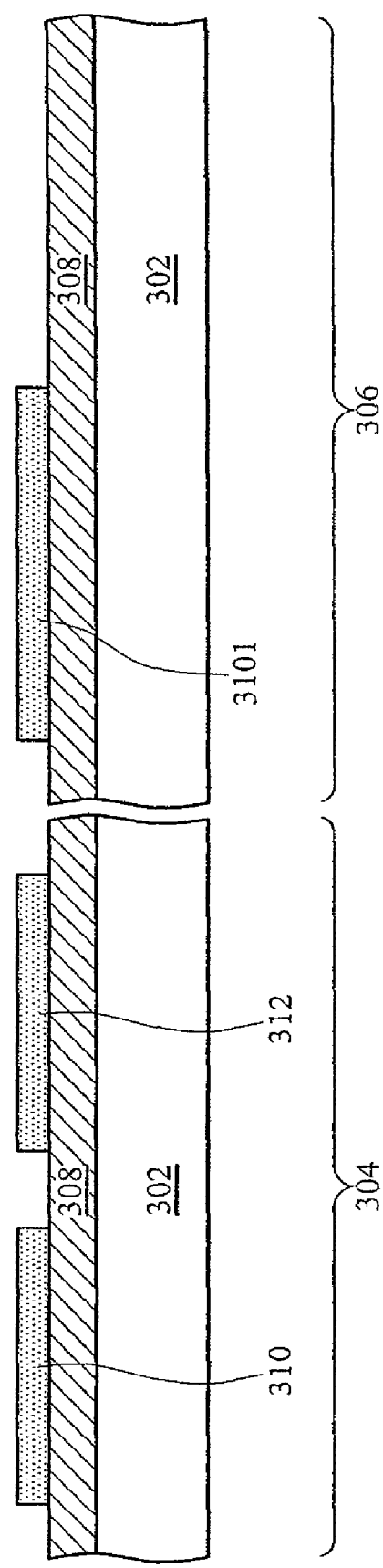
FIGS. 3A~3J show an intermediate cross section of a system for displaying images in accordance with an embodiment of the invention.

FIGS. 3A~3J show an intermediate cross section of a system for displaying images in accordance with an embodiment of the invention. Referring to FIG. 3A, a cleaned substrate 302, used for fabricating a thin film transistor array substrate, comprising a driver area 304 where a peripheral circuit (not shown) is formed and a pixel area 306 is provided, and a buffer layer 308 is formed on the substrate 302. The buffer layer 308 can comprise silicon oxide, silicon nitride, silicon oxynitride or combinations thereof and preferably does a stack comprise a silicon oxide layer and a silicon nitride layer. In one embodiment of the invention, thickness of the silicon nitride layer is about 350 Å~650 Å, and thickness of the silicon oxide layer is about 500 Å~1600 Å.

Next, a semiconductor layer (not shown) is formed on the buffer layer 308. The semiconductor layer can comprise polysilicon. For example, an amorphous silicon layer is first formed by deposition with chemical vapor deposition and then crystallized or annealed with excimer laser, ELA to form a polysilicon layer. The semiconductor layer is defined by conventional lithography and etched to form a first active layer 310 and a second active layer 312 which overly the driver area 304 of the substrate 302 and a third active layer 3101 overlying the pixel area 306 of the substrate 302. In one embodiment of the invention, thickness of the active layers 310, 312 and 3101 is between 350~500 Å, for example, 430 Å.

Figure 3B:
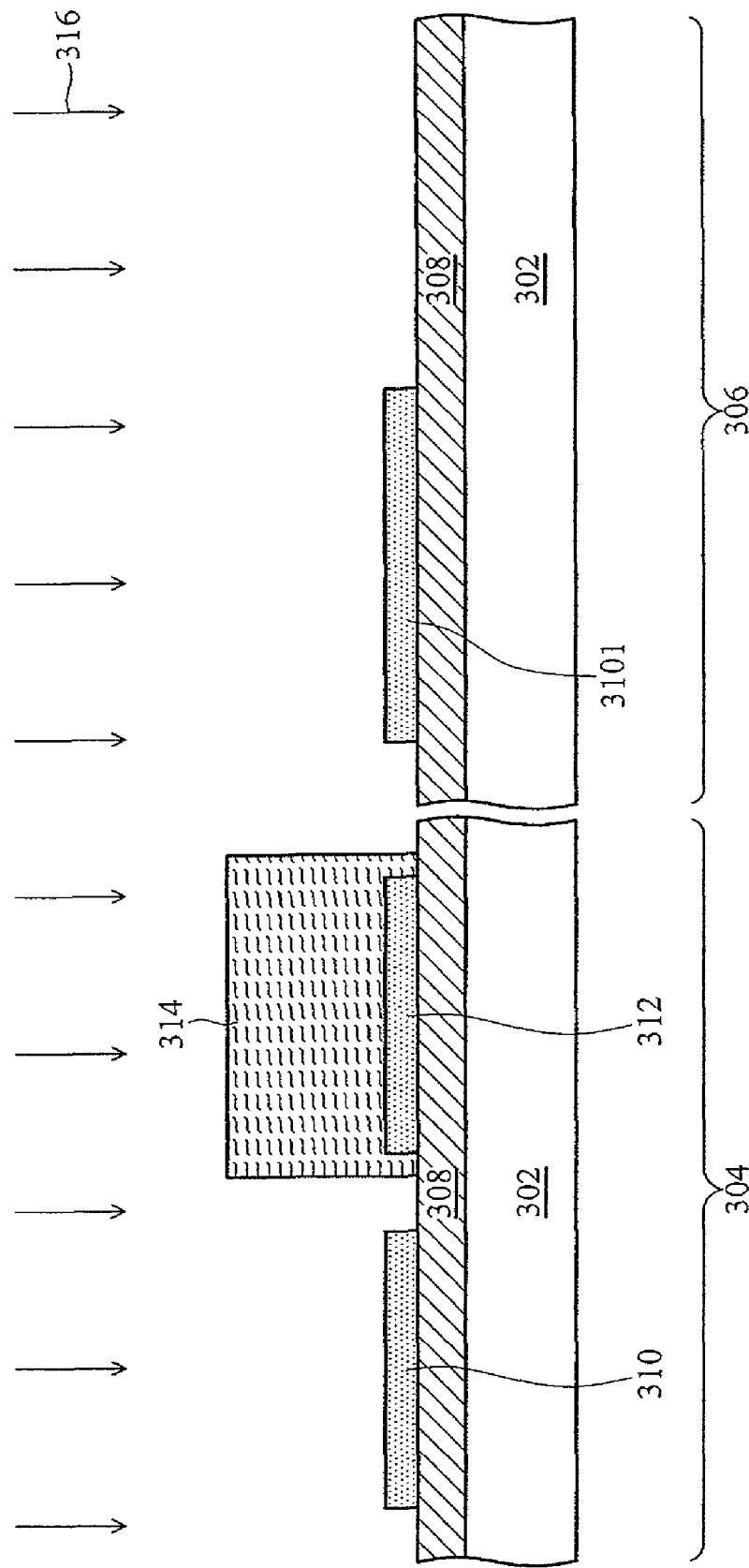

Referring to FIG. 3B, the second active layer 312 is covered by a photoresist layer 314. A channel doping 316 is performed on the active layers 310 and 3101 in which the dopant used can be boron (B+), and the dosage thereof is typically about 0 to 1E13/cm2.

Figure 3C:
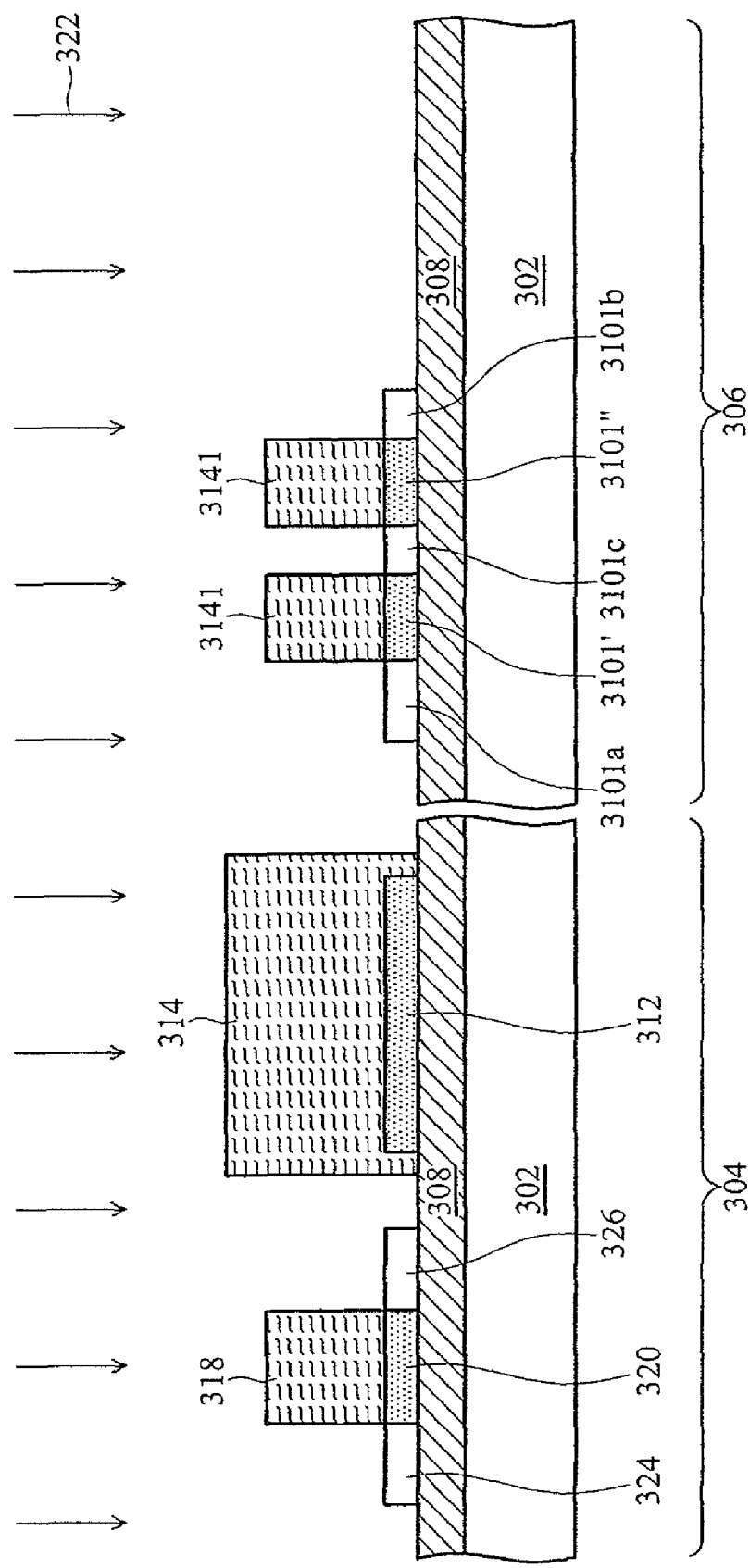

Referring to FIG. 3C, channel regions 3101' and 3101" of the third active layer 3101 are covered by a photoresist pattern 3141 (i.e. the so-called W-gate structure). A channel region 320 of the first active layer 310 is covered by another photoresist layer 318, implanting n-type dopant ions 322 into the first active layer 310 to form a source 324 and a drain 326 of an n type transistor. Meanwhile, n-type dopant ions are implanted into the exposed third active layer 3101, thus, forming heavily doped n-type regions 3101a, 3101b and 3101c thereof. In an embodiment of the invention, the n-type dopant ions can be phosphonium ($PH_x^+$), and the dosage thereof is about 1E14 to 1E16/cm2.

Figure 3D:
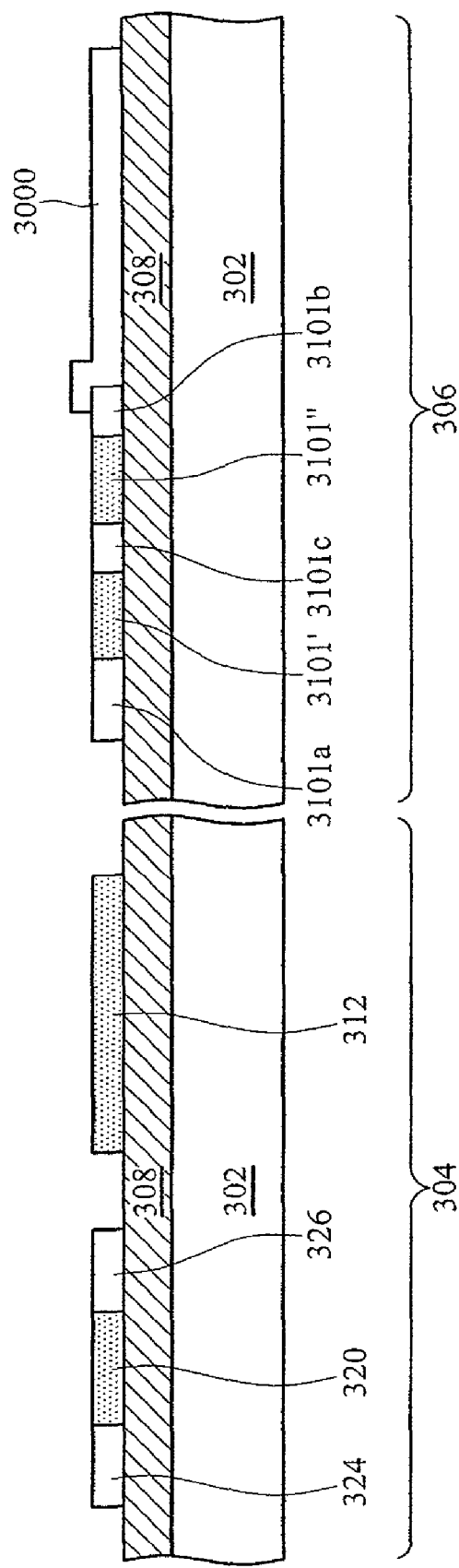

Referring to FIG. 3D, after the photoresist layers 314, 3141 and 318 are removed, a first transparent electrode layer 3000 is formed overlying the buffer layer 308 and is simultaneously attached to a portion of the n-type region 3101b. Formation of the first transparent electrode layer 3000 includes sputtering, photolithography and etching, and the material thereof can be ITO or IZO. It is noted that the first transparent electrode layer 3000 is electrically connected to the n-type region 3101b directly without the use of contact holes.

Figure 3E:
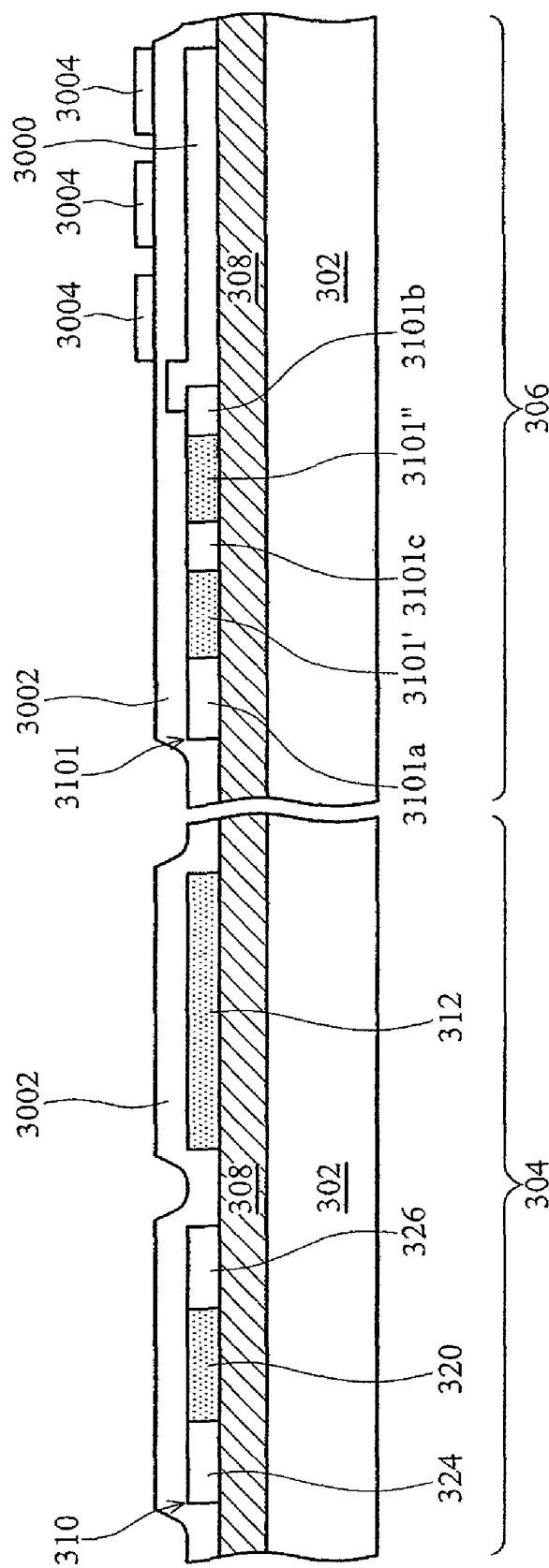

Referring to FIG. 3E, a gate dielectric layer 3002, for example silicon oxide, silicon nitride, silicon oxynitride, or combinations thereof, a stack layer thereof or another high dielectric constant material, is blanketly deposited on the first active layer 310, the second active layer 312, the third active layer 3101, the first transparent electrode layer 3000 and the buffer layer 308. Deposition of the gate dielectric layer 3002 comprises CVD. Thereafter, a second transparent electrode pattern 3004 (also called ITO fingers) is formed on the gate dielectric layer 3002. Formation of the second transparent electrode layer 3010 includes sputtering, photolithography and etching, and the material thereof can be ITO or IZO.

Figure 3F:
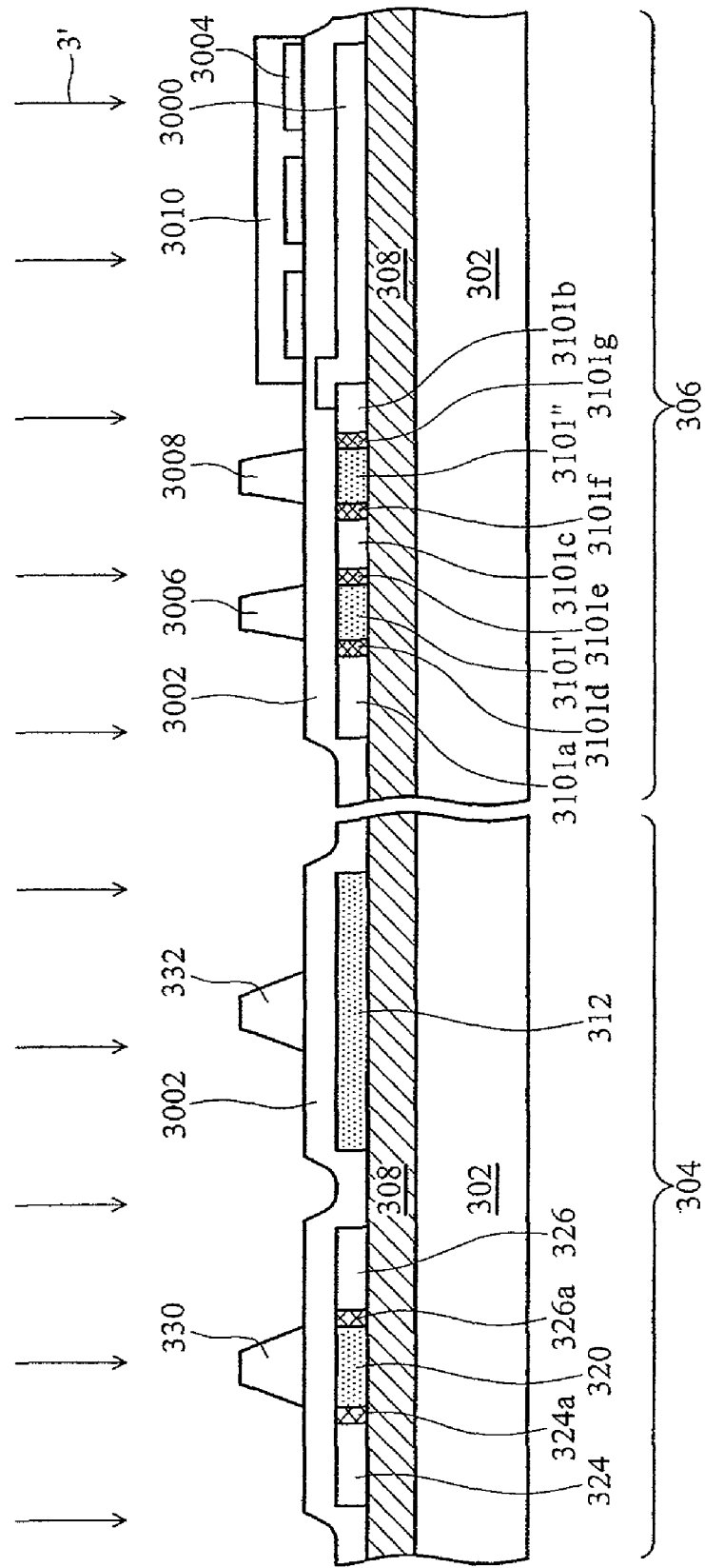

As shown in FIG. 3F, a metal layer (not shown) is deposited and patterned to form scan lines (not shown), common electrodes (not shown), and gate electrodes (or gates) 330, 332, 3006, 3008, and a mask layer 3010 over the second transparent electrode. Next, a lighter n-type doping using, for example, ion implantation, can be performed to form lightly doped drain (LDD) regions 324a and 326a on opposite sides of the channel region 320 of the first active layer 310 of the n type transistor. In addition, lightly doped drain (LDD) regions 3101d and 3101e on opposite sides of the channel region 3101' and lightly doped drain (LDD) regions 3101f and 3101g on opposite sides of the channel region 3101" are simultaneously formed. It is noted that a mask 3010 is formed overlying the second transparent electrode pattern 3004 prior to the LDD doping 3', preventing second transparent electrode pattern 3004 from the striking of the ions. In addition, the second transparent electrode layer 3010 is electrically connected to the common electrodes directly without the use of contact holes, and is a slit-like structure. The gate electrodes 3006 and 3008, gate dielectric layer 3002, and third active layer 3101 construct a twin-gate structure i.e. two gates share the same active layer.

Figure 3G:
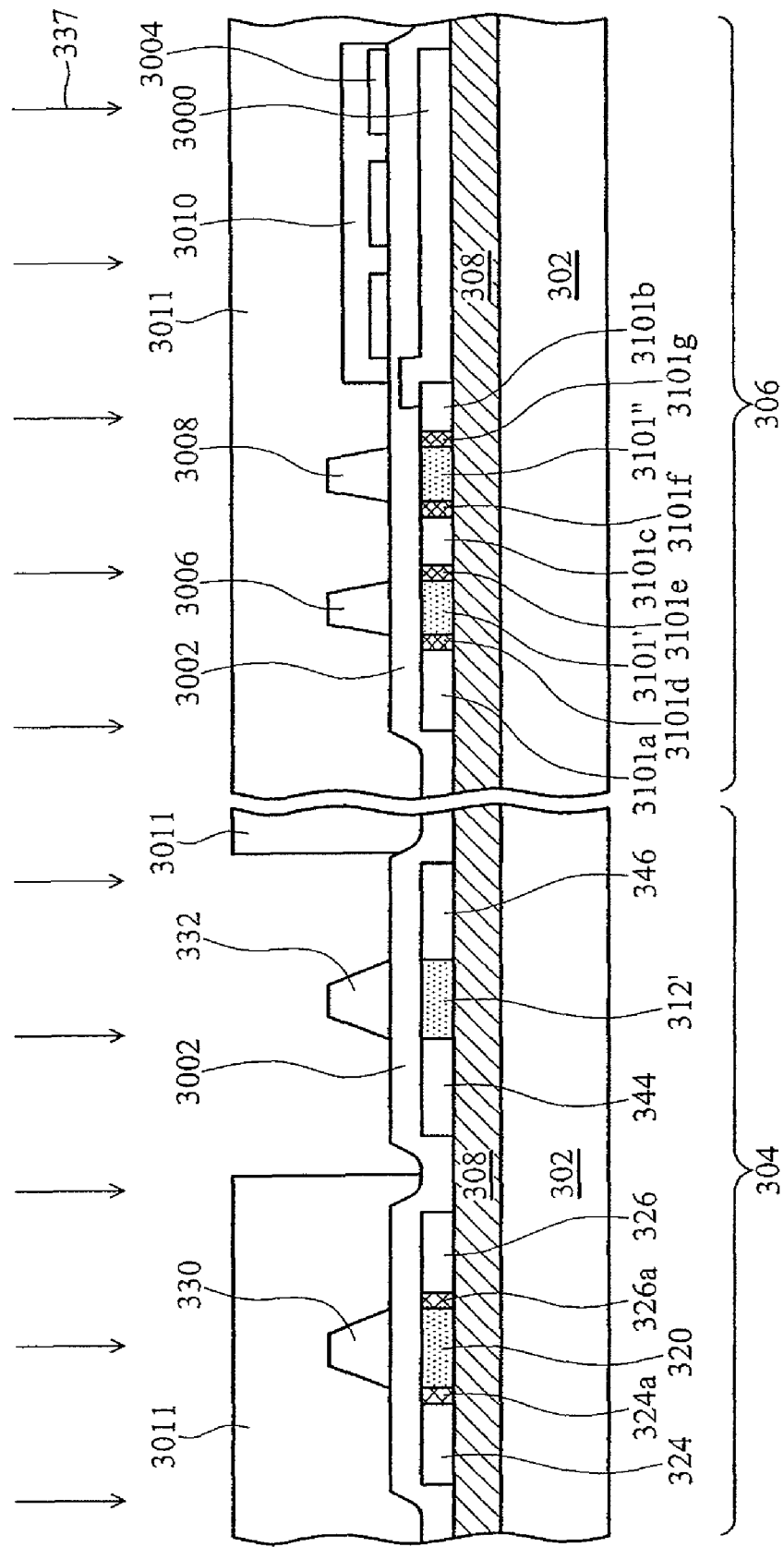

In FIG. 3G, a photoresist pattern 3011 is formed to cover the whole substrate 302, excluding the gate 332 and a portion of the gate dielectric layer 3002. An ion implantation with p-type dopant 337 is performed to form source 344 and drain 346 on opposite sides of the channel region 312' of the p type transistor.

Figure 3H:
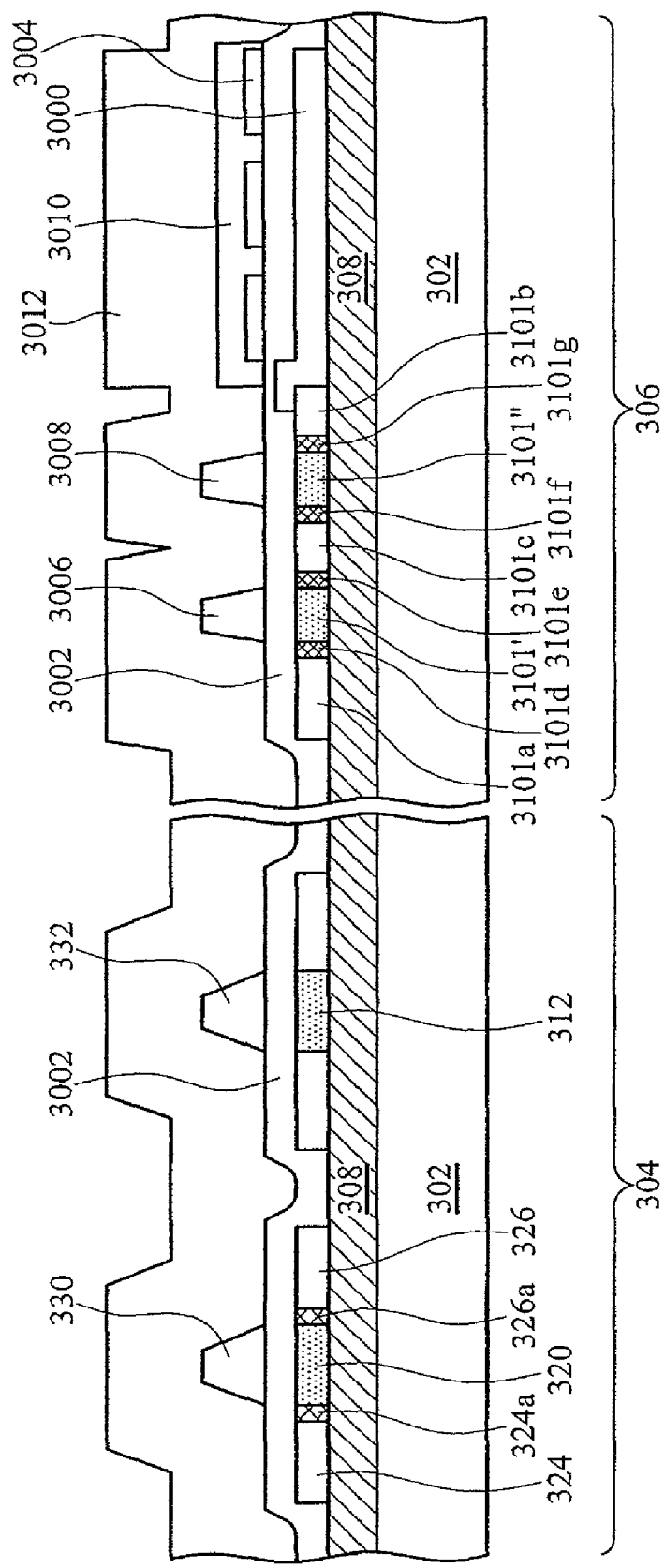

Next, referring to FIG. 3H, the photoresist pattern 3011 is removed. An interlayer dielectric layer 3012 is blanketly deposited overlying the substrate. Generally, the thickness and composition of the dielectric layer 3011 can be determined according to product specifications or process window. For example, the interlayer dielectric layer 3012 may include silicon dioxide, polyimide, spin-on-glass (SOG), fluoride-doped silicate glass (FSG), Black Diamond (a product of Applied Materials of Santa Clara, Calif.), Xerogel, Aerogel, amorphous fluorinated carbon, and/or other materials. In this embodiment of the invention, the interlayer dielectric layer 3012 is a stack layer comprising silicon oxide and silicon nitride. Formation of the interlayer dielectric layer 3012 comprises CVD. In addition, an annealing is conducted to activate the dopants.

Figure 3I:
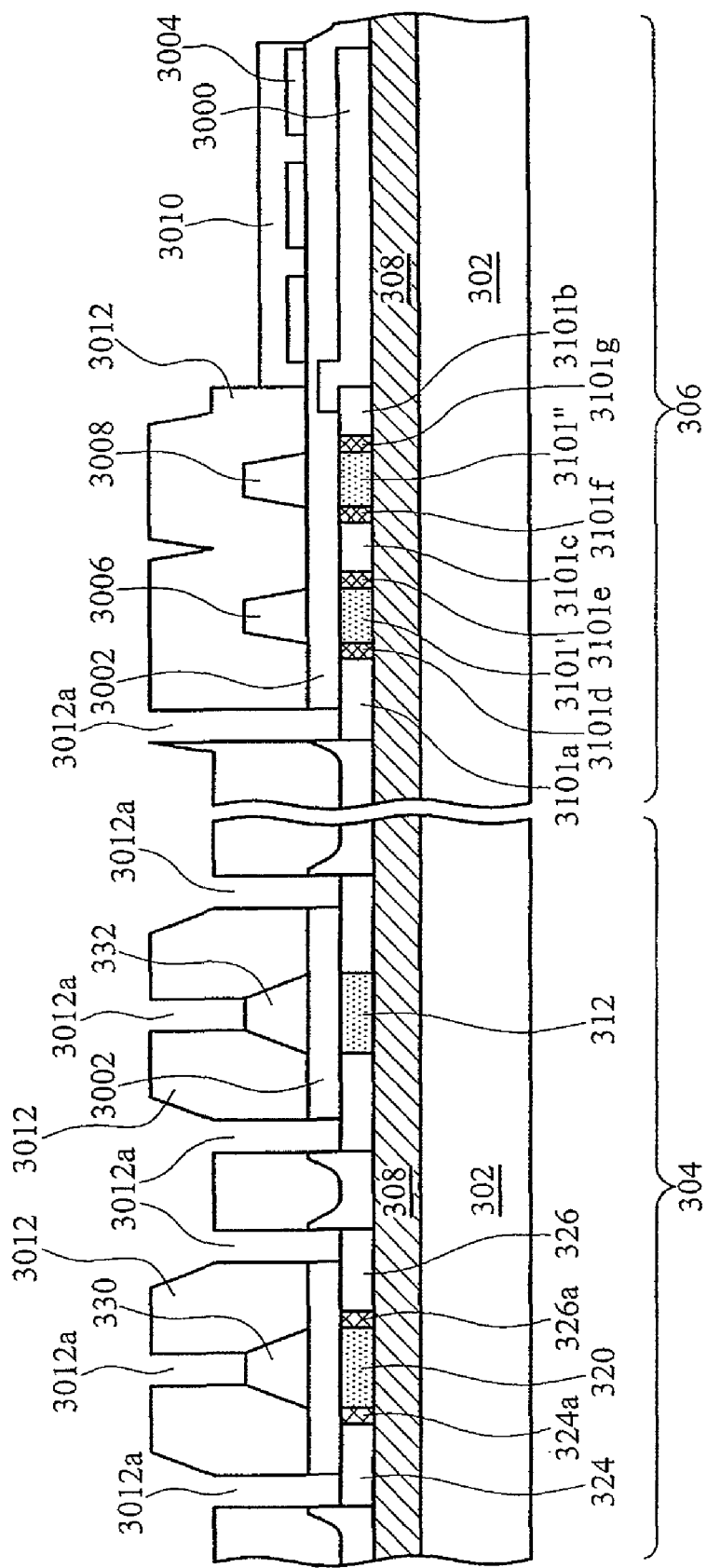

As shown in FIG. 3I, by means of sequential patterning and etching processes, contact holes 3012a are defined and etched through the interlayer dielectric layer 3012 and the gate dielectric layer 3002. The etching comprises a dry etching or a wet etching to expose the second transparent electrode pattern 3004 and the mask 3010. The mask 3010 protects the dielectric layer 3002 between the slits of the transparent electrode pattern 3004 from being etched during the contact-hole etching.

Figure 3J:
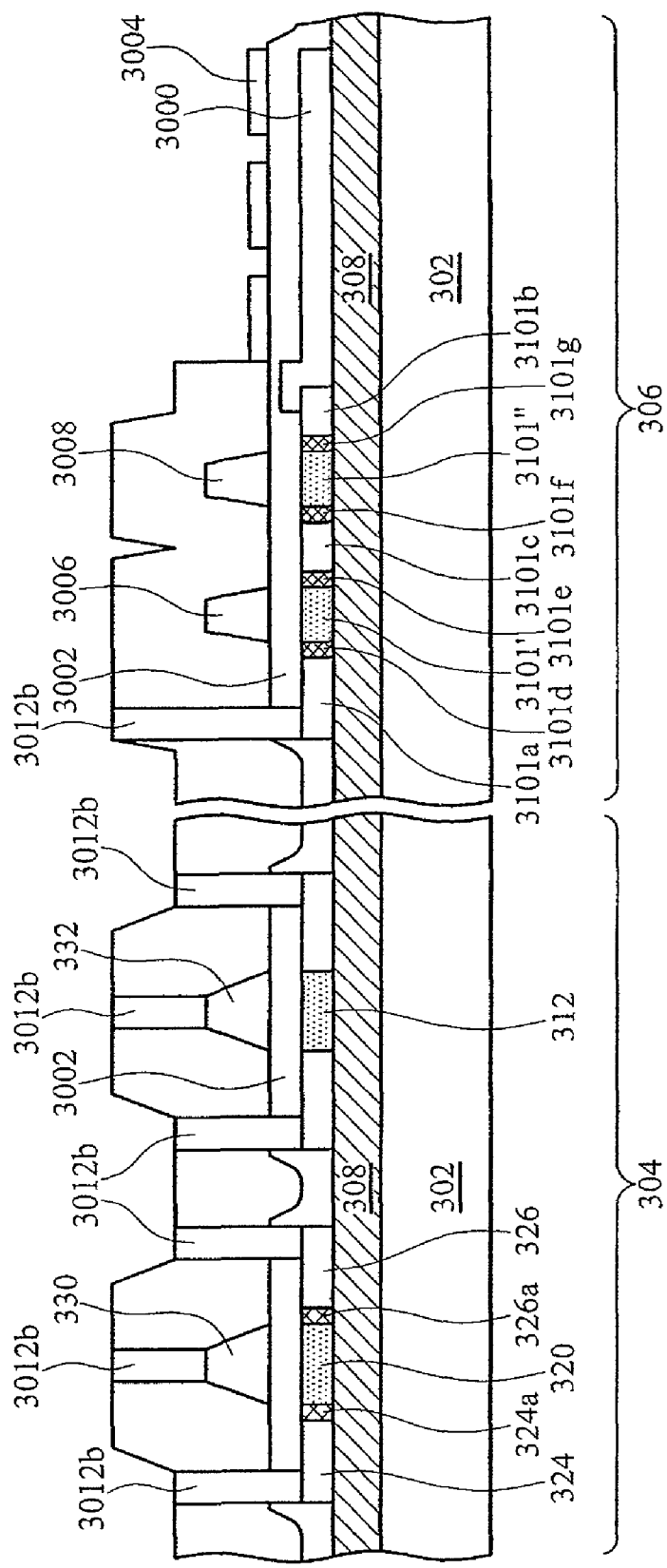

A conductive material film is deposited, for example, by sputtering on the interlayer dielectric layer 3012. As shown in FIG. 3J, the conductive material 3012b fills the contact holes 3012a. The conductive material 3012b can be metal or metal alloy. The data lines are also formed upon patterning and etching of the conductive layer. The mask 3010 is removed by etching during or after the etching of the data lines.

Thereafter, formation of a passivation layer and a planarization layer may be performed immediately or later. Since the subsequent steps are well known to those with ordinary skill in the art, they are omitted here for brevity.

Figure 1:
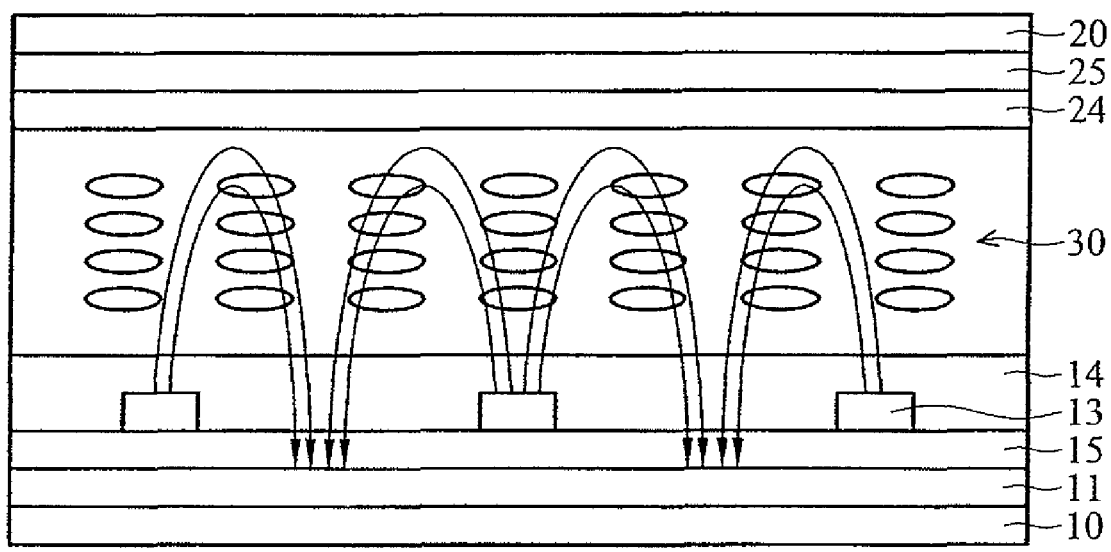
FIG. 1 is a cross section of a conventional fringe field switching liquid crystal display (FFS-LCD) device.
Figure 2:
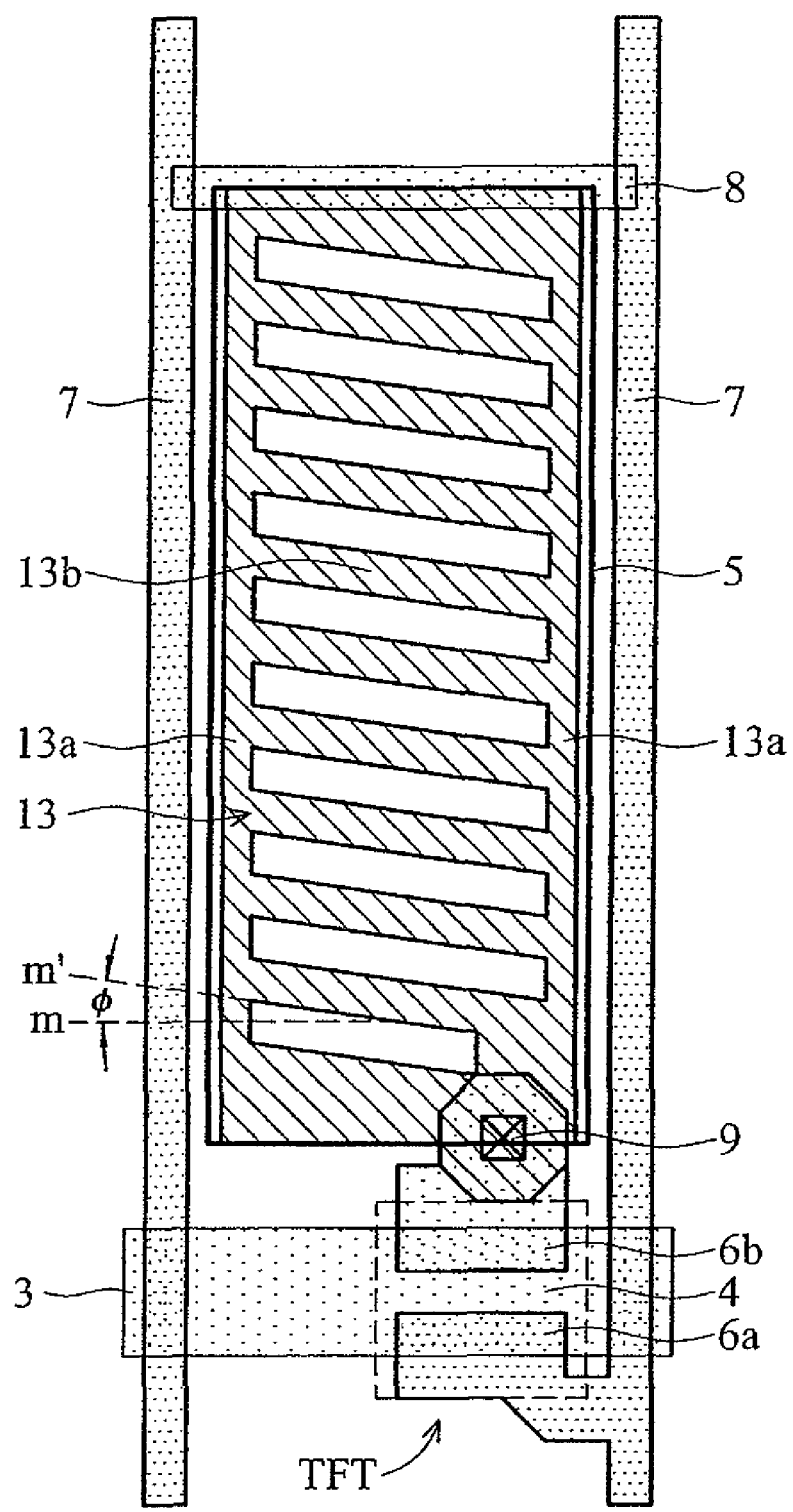
FIG. 2 is a plan view of the lower substrate structure of a conventional fringe field switching liquid crystal display (FFS-LCD) device.
Figure 3K:
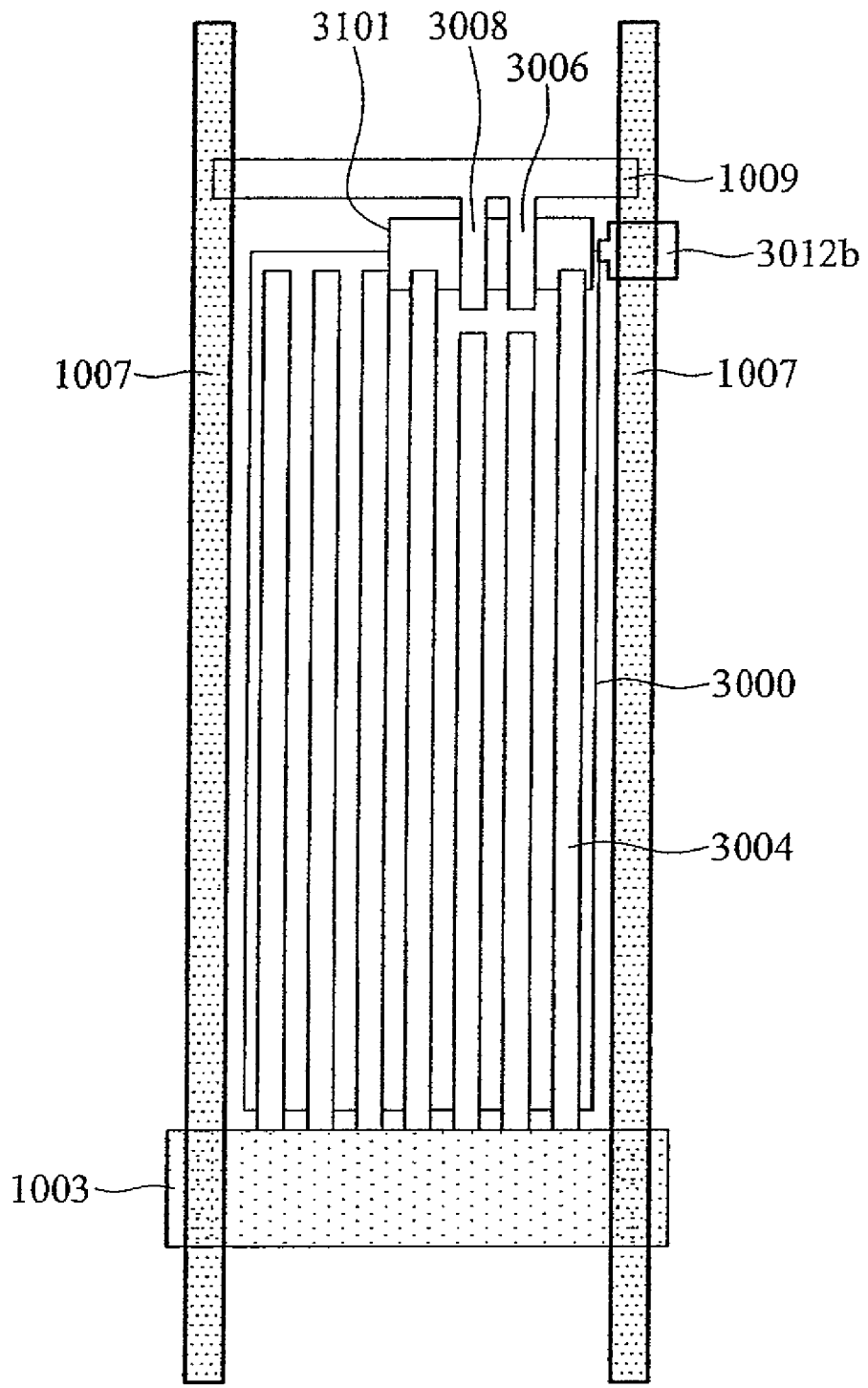
FIG. 3k shows a top view of the resultant structure fabricated by the method of the embodiment.

FIG. 3k shows a top view of the resultant structure fabricated by the previously described processes. Similar to the conventional structure of FIG. 2, the pixel area 306 is defined by two parallel lines 1003, 1009 and two parallel data lines 1007. However, compared to the conventional structure in FIGS. 1 and 2, the resultant structure of the embodiment has less contact holes, thus enhancing the aperture ratio.

Figure 4:
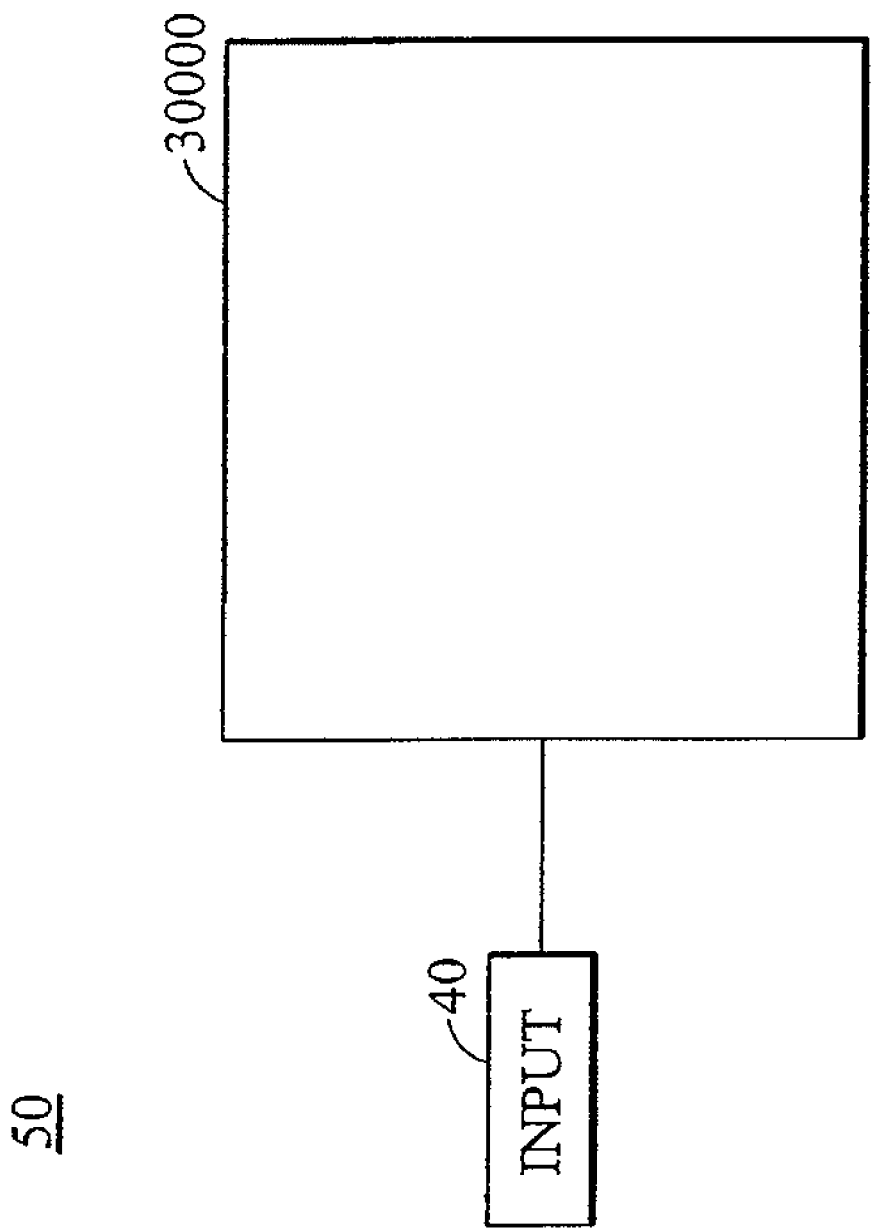
FIG. 4 schematically shows another embodiment of a system for displaying images.

FIG. 4 schematically shows another embodiment of a system for displaying images which, in this example, is implemented as a fringe field switching mode liquid crystal display (FFS-LCD) device 30000 or an electronic device 50. The previously described thin film transistor array substrate can be incorporated into a display panel that can be a fringe field switching mode liquid crystal display (FFS-LCD) panel. In other embodiments, a fringe field switching mode liquid crystal display (FFS-LCD) device can be comprised of the display panel and a controller. In other embodiments, the fringe field switching mode liquid crystal display (FFS-LCD) device 30000 can form a portion of a variety of electronic devices (in this example, electronic device 50). Generally, the electronic device 50 can comprise the fringe field switching mode liquid crystal display (FFS-LCD) device 30000 and the controller and an input unit 40. Further, the input unit 40 is operatively coupled to the fringe field switching mode liquid crystal display (FFS-LCD) device 30000 and provides input signals (e.g., an image signal) to the display panel 20 to generate images. The electronic device 50 can be a mobile phone, digital camera, PDA (personal digital assistant), notebook computer, desktop computer, television, car display, global positioning system (GPS), avionics display or portable DVD player, for example.

The FFS structure of the described embodiments of the invention can be completed using only 9 masks, same as conventional non-FFS structures. The drain-side contact holes (e.g. the contact hole connected to the n-type region 3101b) are not needed, thus improving the aperture ratio. Additionally, as was mentioned before, the common electrode is connected directly to the second transparent electrode, thus not requiring additional contact holes. Accordingly, compared to the prior art of forming FFS TFT structures, two contact holes are reduced per pixel. The dielectric layer between the two transparent electrode layers has same thickness as the gate dielectric layer which is thinner than that used in conventional FFS structures, thus requiring less FFS driving voltage. Also, since this dielectric layer is thin, the storage capacitor value is high, hence the liquid crystal mode has less cross-talk, and can also withstand higher back-light intensity.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
    a display panel, comprising:
    a lower substrate with a first surface, wherein the first surface is divided into a pixel area and a driver area;
    a peripheral circuit within the driver area on the first surface;
    at least one thin film transistor is formed in the pixel area, wherein the thin film transistor comprises an active layer, a gate dielectric layer overlying the active layer, and a gate electrode overlying the gate dielectric layer, wherein the active layer has source and drain regions;
    a first transparent electrode layer overlapping a terminal portion of the drain region and in direct contact with top and side surfaces of the terminal portion of the drain region, electrically connected thereto;
    a second transparent electrode pattern disposed on the gate dielectric layer, opposing the first transparent electrode layer; and
    common electrodes electrically connected to the second transparent electrode pattern directly without the use of contact holes.

2. The system as claimed in claim 1, further comprising;
    an interlayer dielectric layer formed overlying the at least one thin film transistor, exposing the second transparent electrode pattern; and
    a contact hole electrically connected to the source region.

3. The system as claimed in claim 1, wherein the first transparent electrode layer and the second transparent electrode pattern are materials including ITO or IZO.

4. The system as claimed in claim 1, further comprising an upper substrate including a color filter and a black matrix layer.

5. The system as claimed in claim 1, further comprising an electronic device, wherein the electronic device comprises:
    the display panel; and
    an input unit coupled to the display panel and operative to provide input to the display panel such that the display panel displays images.

6. The system as claimed in claim 5, wherein the electronic device is a mobile phone, digital camera, PDA (personal digital assistant), notebook computer, desktop computer, television, car display, or portable DVD player.

7. The system as claimed in claim 1, wherein the second transparent electrode pattern is a slit-like structure.

8. The system as claimed in claim 1, wherein the at least one thin film transistor is a twin-gate structure in which two gates share the same active layer.

* * * * *